United States Patent [19]
Deguchi et al.

[11] Patent Number: 5,345,257
[45] Date of Patent: Sep. 6, 1994

[54] BOX BODY CONSTRUCTION OF A DIGITAL IMAGE FORMING APPARATUS

[75] Inventors: Hiroyuki Deguchi, Osaka; Hirotoshi Tagawa, Kyoto, both of Japan

[73] Assignee: Mita Industrial Co., Ltd., Osaka, Japan

[21] Appl. No.: 846,124

[22] Filed: Mar. 4, 1992

[30]     Foreign Application Priority Data

Mar. 8, 1991 [JP]   Japan .................................. 3-043083
Mar. 8, 1991 [JP]   Japan .................................. 3-043084

[51] Int. Cl.$^5$ ............................................. G01D 15/00
[52] U.S. Cl. ................................... 346/145; 355/200
[58] Field of Search ................ 346/145, 160; 355/200, 355/210; 248/638, 560, 562

[56]               References Cited
           U.S. PATENT DOCUMENTS

| | | | |
|---|---|---|---|
| 4,702,587 | 10/1987 | Miyoshi | 355/200 |
| 4,799,080 | 1/1989 | Fujiwara | 355/218 |
| 4,814,817 | 3/1989 | Nishijima et al. | 355/200 X |
| 4,969,010 | 11/1990 | Tamura et al. | 355/75 |
| 5,047,801 | 9/1991 | Haneda et al. | 355/200 |

*Primary Examiner*—A. T. Grimley
*Assistant Examiner*—T. Dang
*Attorney, Agent, or Firm*—Koda and Androlia

[57]                ABSTRACT

A box body construction of a digital image forming apparatus divided into an upper box body and a lower box body and having a vibration source at least in either one of the box bodies, in which vibrations occurring from the vibration source can be absorbed by vibration suppressing action of elastic members intervened and arranged between the upper box body and the lower box body. Therefore, respective box bodies are not affected by vibrations from the other box body.

6 Claims, 8 Drawing Sheets

BOX BODY CONSTRUCTION OF A DIGITAL IMAGE FORMING APPARATUS

BACKGROUND OF THE INVENTION

1. Field of the invention

The present invention relates to a box body construction which is preferably used for a digital image forming apparatus of, for example, a copying machine, a facsimile machine, etc..

2. Description of the Prior Art

As shown in FIG. 13, in this kind of a conventional box body construction of a digital image forming apparatus, a document (not illustrated) is placed on a document table 2 arranged in an upper box body 1. Thereafter, images of the document are read by scanning the document with a CCD line sensor (not illustrated) which is arranged in the upper box body 1 and constitutes a scanner unit 3. In this case, the scanner unit 3 is driven by a motor (not illustrated ) arranged in the upper box body 1.

Data of the document images read as shown above is outputted to a laser scanning unit (hereinafter, laser scanning unit is abbreviated into LSU) 5 arranged in a lower box body 4 on which the upper box body 1 is placed and supported. The LSU 5 is removably placed on a panel 6 fixed to a frame body (not illustrated) in the lower box body 4 with screws. Electrostatic latent images are formed on a photosensitive drum 7 by the LSU 5, based on the data of the above document images. Thereafter, the document images corresponding to the electrostatic latent images are transferred on a sheet of paper (not illustrated).

In this case, the photosensitive drum 7 is arranged under the panel 6 in the frame body and constitutes a printer unit 8, and the photosensitive drum 7 is driven by another motor (not illustrated) arranged in the lower box body 4 independently from the drive source in the upper box body 1 as well as the LSU 5, etc..

And in the digital image forming apparatus, the upper box body 1 is composed with the maintenance efficiency in the lower box body 2 taken into consideration so that it can slide sidewards relative to the lower box body 4.

Hence, in the conventional box body construction of the digital image forming apparatuses composed as shown above, it is necessary to make the upper box body 1 slide sidewards relative to the lower box body 4 as described above when carrying out maintenance in the lower box body 4, for example, maintenance of the LBU 5. For this reason, comparatively wide space including space necessary for sliding of the upper box body 1 must be secured as space for installation of the corresponding digital image forming apparatus.

Hence, recently such structure that the upper box body 1 is openably installed in the vertical direction thereof by means of hinge units comprising a pin and a supporting hole thereof relative to the lower box body n has been proposed for the purpose of saving space for installation of the apparatus.

And as described above, motors are separately provided in the upper box body 1 and the lower box body n, respectively, and it has been also proposed that elastic members consisting of rubber plate, etc. are intervened between the upper box body 1 and the lower box body 4 for the purpose of suppressing vibrations, taking it into consideration that images reading and image formation are not affected by vibrations which are mutually transmitted to each of the box bodies with respective motors acted as vibration source on drive of these motors.

However, even though elastic members are, as described above, intervened and arranged between the upper box body 1 and the lower box body 4 as vibration suppressing countermeasure in such construction that the upper box body 1 and the lower box body 4 are connected to each other only by means of such hinge units as described above, such inconvenience as vibrations may be mutually transmitted through the hinge units may be resulted therefrom.

On the other hand, in a box body construction of such conventional digital image forming apparatuses as described above, they are used with the upper box body 1 placed on the lower box body 4 by providing motors separately in the upper box body 1 and the lower box body 4, respectively, as described above. For this reason, vibrations on drive of respective motors are mutually transmitted to each of the box bodies, for example, adverse influences may be given to reading and formation of images.

Hence, since the elastic members are merely put between the upper box body 1 and the lower box body 4, such inconvenience as the positional relation between the upper box body 1 and the lower box body 4 may slip off, for example, in transit or movement of the corresponding apparatus, has occurred.

SUMMARY OF THE INVENTION

The present invention has been made in order to solve such problems which exist in tile prior arts.

It is therefore the first object of the present invention to provide such a box body construction of a digital image forming apparatus that can prevent adverse influences, for example, in reading and formation of images due to vibrations. Namely, the first invention is to provide a box body construction of a digital image forming apparatus divided into an upper box body and a lower box body and having a vibration source installed at least in either one of the box bodies and being characterized in that the upper box body is supported on the lower box body with intervention of an elastic member between the box bodies.

For example, in a box body construction of a digital image forming apparatus according to the first invention, vibrations which occur by operation of a drive source in each of the box bodies can be absorbed by vibration suppressing action of elastic member, for example, image reading and image formation are not affected by vibrations thereof.

A box body construction according to the first invention may be a box body construction in which the elastic member is fixed to both the upper box body and the lower box body and is disengageably fixed to the lower box body or a box body construction in which the elastic member is fixed to both the upper box body and the lower box body and is disengageably fixed to the upper box body.

In the case that one of these box body constructions is employed, as both the upper and the lower box bodies are fixed with intervention of the elastic member, the digital image forming apparatus can be transported and moved under a stabilized condition.

Furthermore, when carrying out maintenance to the inside of the box body in the digital image forming apparatus, the engaged status of the elastic member with either one of the box bodies is released, thereafter the upper box body can be moved relative to the lower box body.

And the second object of the present invention is to provide a box body construction of a digital image forming apparatus which is provided with hinge unit not affecting the vibration suppressing action and causing the upper box body to be securely supported and to be opened and closed when opening up and closing the upper box body, under such a condition that the effect of vibration suppressing action can be secured with the upper box body placed on the lower box body with intervention of elastic member. Namely, the second invention is to provide a box body construction of a digital image forming apparatus divided into an upper box body and a lower box body and having a vibration source at least in either one of the box bodies, and the upper box body is openably installed with a hinge unit comprising a pin and a supporting hole thereof relative to the lower box body and supported on the lower box body with intervention of an elastic member between the box bodies, and being characterized in that the supporting hole is so formed for the outer diameter dimension of the pin that the size of the supporting hole as to width direction is set so that such clearance as vibrations can not be mutually transmitted through the hinge unit between the upper box body and the lower box body can be obtained under such a condition that the upper box body is placed on the lower box body, and that the size of the supporting hole as to the vertical direction is set to such dimension as larger than the amount of movement of the upper box body in accompanying with the elastic deformation of the elastic member when the upper box body is placed on the lower box body and then such a dimension that the vibrations can not be transmitted, and is set to such dimension that the load of the upper box body can be directly supported by the hinge unit with the pin engaged with the supporting hole in accompanying with the opening up movement when the upper box body is opened up.

For example, in the box body construction of the digital image forming apparatus, under such a condition that the upper box body is placed on the lower box body, the pin is not directly in touch with the supporting hole thereof as clearance is suitably formed at the surrounding of the corresponding pin, and the upper box body is placed on the lower box body only with intervention of an elastic member. Under this condition, vibrations which come from a vibration source arranged at least in either one of the box bodies is attenuated by the vibration suppressing action of the elastic member and such inconvenience as vibration is transmitted to the other box body can be prevented.

Furthermore, when opening up the upper box body, as the pin gets into touch with the supporting hole to the opening up movement thereof, load of the upper box body can be directly supported by the hinge unit, thereby causing the supporting status thereof to be stabilized and secured.

This specification specifically points out the subject of the present invention and ends with the claims clearly claimed herein, and it is considered that the present invention is well understood with the ensuing description thereof with reference to the drawings attached hereto.

DETAILED DESCRIPTION OF THE PREFERRED EMBODIMENTS

Figure 1:
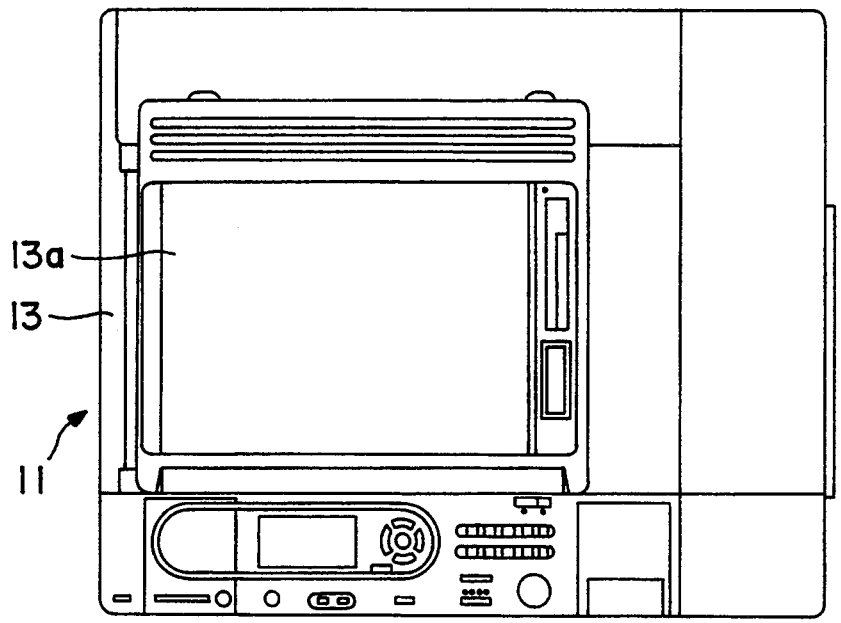
FIG. 1 is a plan view of a digital image forming apparatus according to a preferred embodiment of the present invention.
Figure 2:
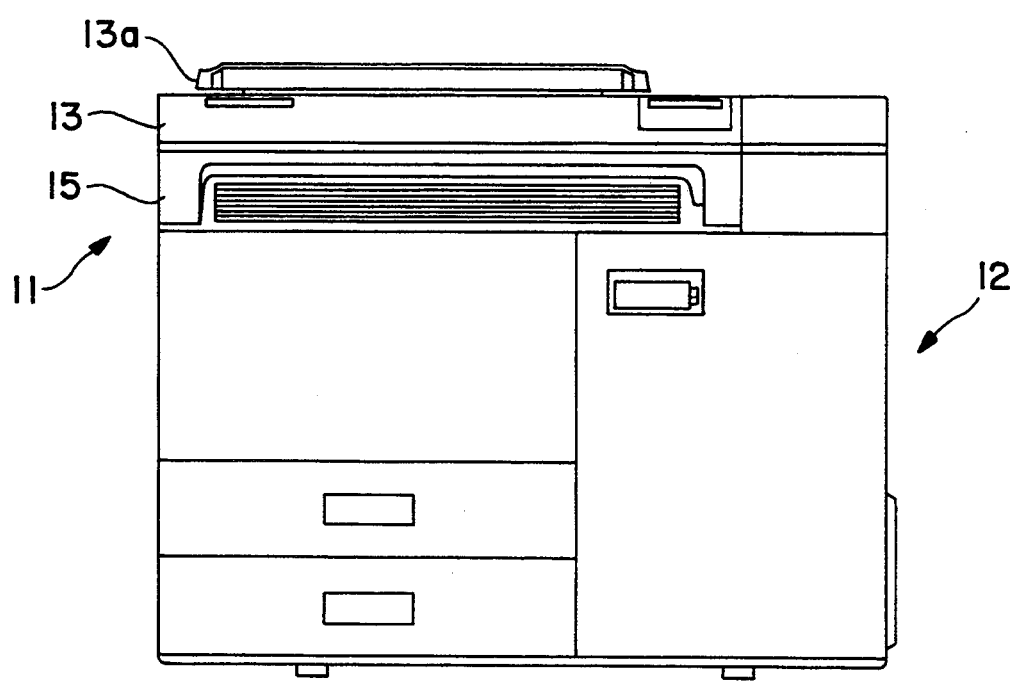
FIG. 2 is a front elevation view of the digital image forming apparatus.
Figure 3:
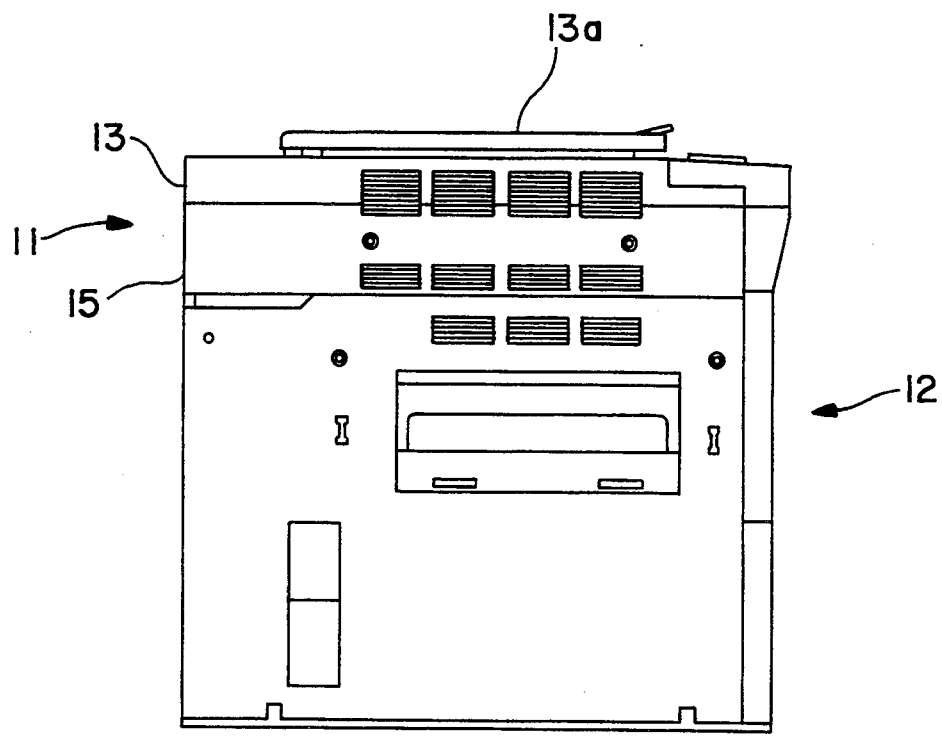
FIG. 3 is a side elevation view of the digital image forming apparatus.
Figure 4:
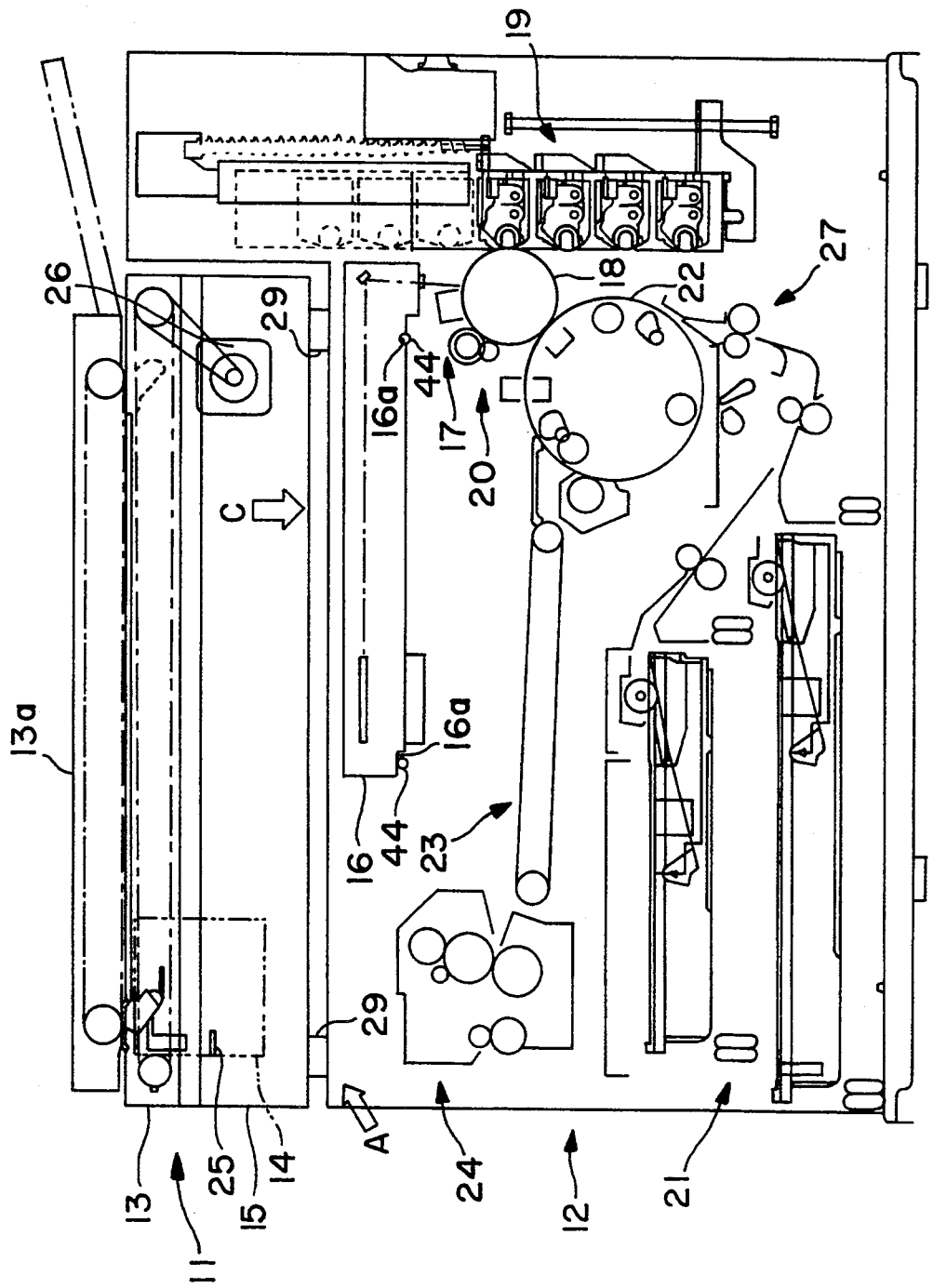
FIG. 4 is an outlined view of the internal construction of the digital image forming apparatus.

As shown in FIG. 1 through FIG. 5, the digital image forming apparatus according to the preferred embodiment is constructed with an upper box body 11 and a lower box body 12 separated. The upper box body comprises a document table 13 provided with, for example an auto document feeder (ADF) 13a and a scanner unit etc. provided with a scanning/reading unit 14. Furthermore the lower box body 12 comprises a universal laser scanning unit (LSU) 16, an electrifying unit 17, a photosensitive drum 18, a developing unit 19, a cleaning unit 20, a paper feeding unit 21, a transfer drum 22, a delivery unit 23 and a fixing unit 24, etc. in its internal.

And as a document is fed to an appointed position by the ADF 13a on the document table 13, a CCD line sensor 25 which constitutes the scanning/reading unit 14 is driven by a motor 26 installed in the upper box body 11, and images of the document are scanned and read.

Data of the document images read as shown above is outputted to the LSU 16, and electrostatic latent images are formed on the photosensitive drum 18 by operation of the electrifying unit 17 and the LSU 16 in accordance with the data of the document images.

Electrostatic latent images formed on the photosensitive drum 18 are turned into visible images by operation of the developing unit 19, and the document images which have been turned into visible images are transferred on a transfer paper which is fed from the paper feeding unit 21 onto the transfer drum 22. The transfer paper on which the document images are transferred is sent to the fixing unit 22 by the delivery unit 23 and is delivered out of a copying machine after the document images are processed and fixed by the fixing unit 24.

In the digital image forming apparatus, the printer unit 27 comprises the electrifying unit 17, the photosensitive drum 18, the developing unit 19, the cleaning unit 20, the transfer drum 22, etc.. And the printer unit 27, etc. are driven by a plurality of motors (not illustrated) which are separately installed in the lower box body 12 independently from the motor 26, etc. in the upper box body 11.

And in the above digital image forming apparatus, the upper box body 11 is so installed that it can be opened up upwards relative to the lower box body 12, centering around the hinge unit 28 provided at the back side thereof.

Thereby, when maintenance, etc. is carried out to the LSU 16 in the lower box body 12, the top of the LSU 16 can be exposed only by opening up the front portion of the upper box body 11 upwards. Consequently, the work efficiency for maintenance, etc. can be remarkably improved.

And, in this case, as the upper box body 11 can be opened up as shown above, the corresponding digital image forming apparatus can be installed in a comparatively narrow space in the lateral direction thereof, in comparison with such a type as the upper box body is caused to slide sidewards, and the space over the lower box body is opened as for the conventional apparatuses.

On the other hand, in the case that the digital image forming apparatus is used with the upper box body 11 placed on the lower box body 12, elastic members 29 (Refer to FIG. 4 and FIG. 6) are intervened and arranged between the upper box body 12 and the lower box body 12, taking it consideration that vibrations produced by drive of the motors provided respectively in the upper box body 11 and the lower box body 12 may not be transmitted to each other.

The elastic member 29 is provided with a fixing bracket 31 mounted with a screw 30 and is attached to the lower side of the upper box body 11 with a screw 32. And the fixing bracket 31 is removably fixed to the lower box body 12 with a screw 33. Therefore, the upper box body 11 can be opened up upwards relative to the lower box body by removing the screw 33.

Figure 6:
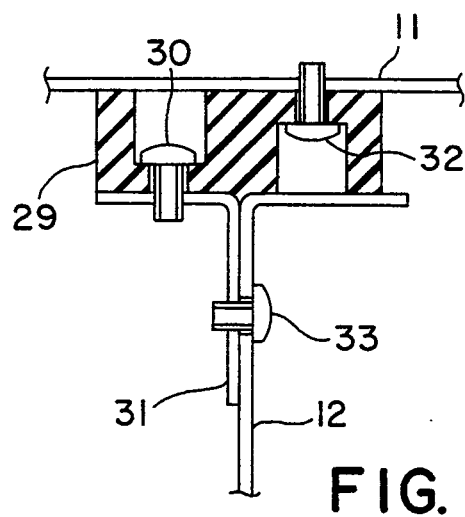
FIG. 6 is a cross sectional view showing the detailed structure of the part shown with an arrow A in FIG. 4.
Figure 7:
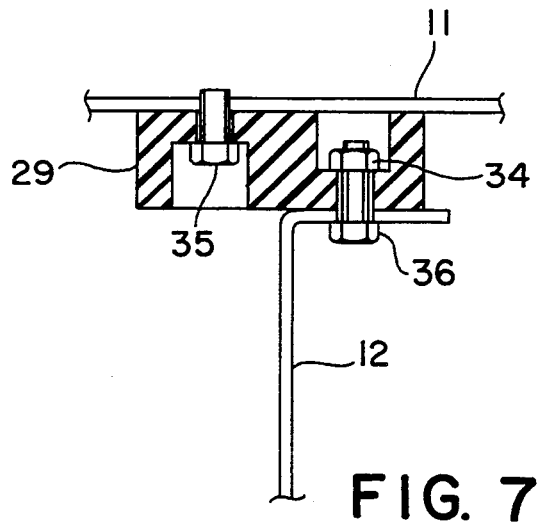
FIG. 7 is a view equivalent to that of FIG. 6, showing another preferred embodiment which is applicable to the part shown with an arrow A in FIG. 4.

Instead of the mounting structure of the elastic member 29 as shown in FIG. 6, such mounting structure as mounting the elastic member 29 according to the type shown in FIG. 7 may be adopted.

Namely, in the preferred embodiment shown in FIG. 7, the elastic member 29 is provided with a nut 34 in advance and is fixed to the lower side of the upper box body 11 with a bolt 35. And the bolt 36 is screwed to the nut 34 with the upper box body 11 placed on the lower box body 12 with intervention of the elastic member 29, thereby causing the upper box body 11 to be fixed integrally with the lower box body 12.

Namely, the screws 30, 32, bolts 35, 36 and nut which are used as fixing members for fixing the elastic member 29 to the upper box body 11 or the lower box body are installed in no contact with the upper box body 11 or the lower box body 12, thereby causing the vibration suppressing action by the elastic member 29 to be made secure.

Furthermore, in order to heighten the vibration suppressing action by the elastic members 29, for example, natural rubber, chloroprene rubber, butyl rubber or acrylnitril rubber, etc. are preferable as material of the elastic members 29. Furthermore, in order to obtain effect of accurate positioning of the upper box body 11 relative to the lower box body 12 simultaneously with good vibration suppressing effect secured, it is desirable that for example, each kind of rubber material of which Rockwell hardness is not less than 40 degrees and is not greater than 90 degrees as rubber hardness is used.

As such structure as described is used as placing structure of the upper box body 11 relative to the lower box body 12 is employed, vibrations produced by drive of motors provided in each of the box bodies can be attenuated, and any inconvenience of mutually giving adverse influences, for example, on reading and formation of images due to vibrations can be omitted. As a result, highly precision document images can be obtained on a transfer paper.

Since the upper box body 11 and the lower box body 12 are disengageably fixed to each other with screw members with intervention of the elastic members 29, it is possible to move and transport the digital image forming apparatus under a stable condition.

Inversely of the preferred embodiments shown in FIG. 6 and FIG. 7, such structure that the elastic members 29 are originally fixed to the upper side of the lower box body 12 and disengagement is made between the upper box body 11 and the elastic members 29 when opening up the upper box body 11 may be adopted.

Furthermore, in the case of such structure that the upper box body 11 is connected to the lower box body 12 simply by a hinge unit comprising a pin and a supporting hole in which the pin is inserted, under such a status that vibration suppressing action is brought by placing the upper box body 11 on the lower box body 12 by means of elastic members 29 as described above, the vibration suppressing action by the elastic members 29 may be disturbed since vibrations are mutually transmitted through the hinge unit. Here, in the case that the vibration suppressing action is intended to be secured at the corresponding hinge unit, the hinge unit itself must be of comparatively flexible structure, and the upper box body 11 will not be able to be supported in secure status when it is opened up.

Figure 5:
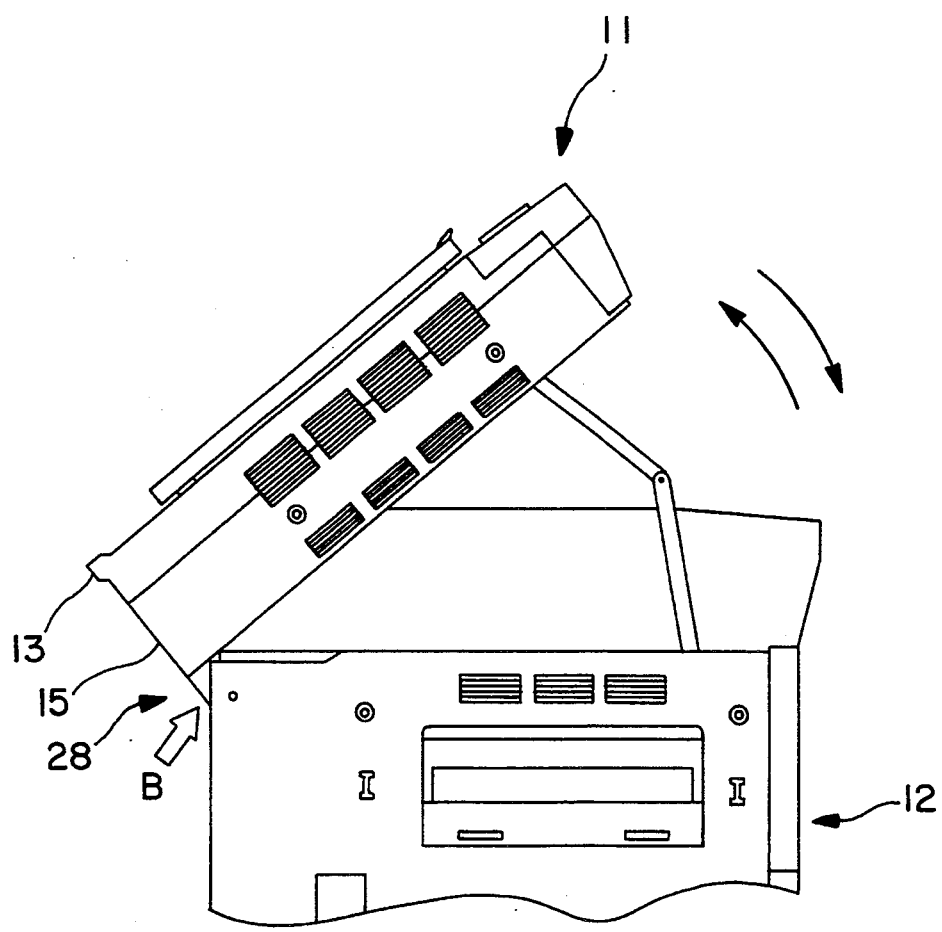
FIG. 5 is a side elevation view showing principal parts with the upper box body opened up in the digital image forming apparatus.
Figure 8:
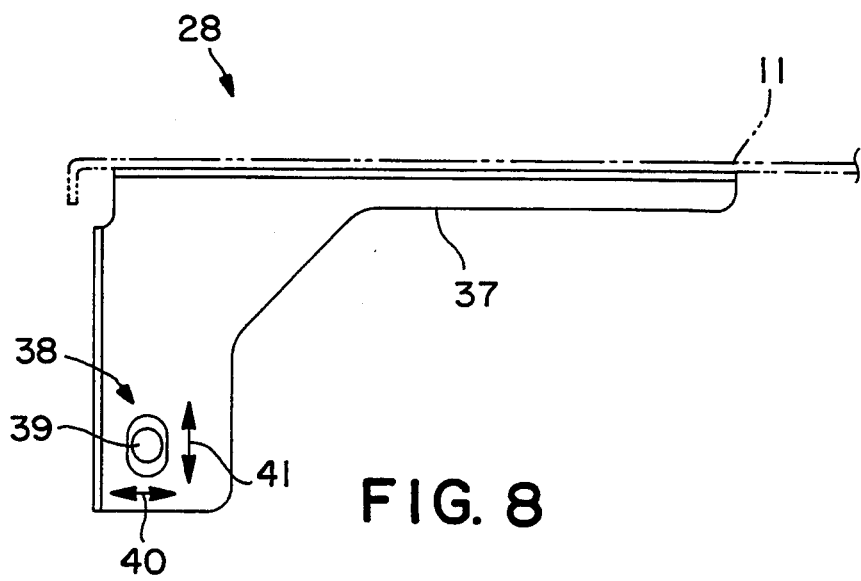
FIG. 8 is a side view of principal parts showing the detailed structure of the part shown with an arrow B in FIG. 5, FIGS. 9(A)–9(C) are explanatory views showing the procedures for opening up the upper box body in the digital image forming apparatus.

Hence, in the structure of the present preferred embodiment, the hinge unit 28 has been designed as follows;

Namely, a bracket 37 formed to be roughly L-shaped, using a flat plate, is attached to the underside of the upper box body 11 at the hinge units 28 as shown in FIG. 5 and FIG. 8. A supporting hole 38 is drilled and provided at one end side of the bracket 37, and a pin 39 attached to the lower box body 12 is freely inserted in the supporting hole 38.

In this case, relative to the width direction of the supporting hole 38 (the direction of an arrow 20) for the outer diameter dimension of the pin 39, the size of the supporting hole 38 is determined so that such clearance as vibrations can not be mutually transmitted through the hinge unit 28 between the upper box body 11 and the lower box body 12 can be obtained under such a condition that the upper box body 11 is placed on the lower box body 12 with intervention of the elastic members 29. And relative to the vertical direction (the direction of an arrow 41) thereof, the size of the supporting hole 38 is larger than the amount of movement of the upper box body 11 in accompanying with the elastic deformation of the elastic members 29 when the upper box body 11 is placed on the lower box body 12, has such clearance that the vibrations can not be transmitted under the placed condition thereof and is set to such slit dimension as can directly support the load of the upper box body 11 by the corresponding hinge unit 28 with the pin 39 engaged with the supporting hole 38 (FIG. 9 (B) and FIG. 9 (C)) in accompanying with the opening up movement when the upper box body 11 is opened up.

Figure 9A:
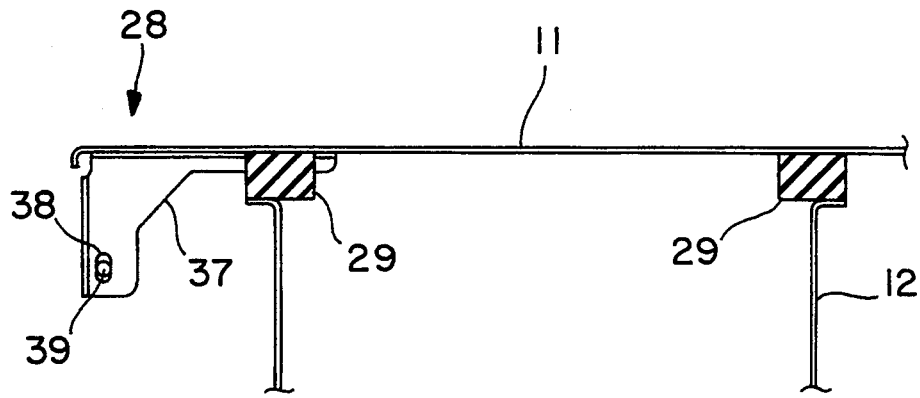
Figure 9B:
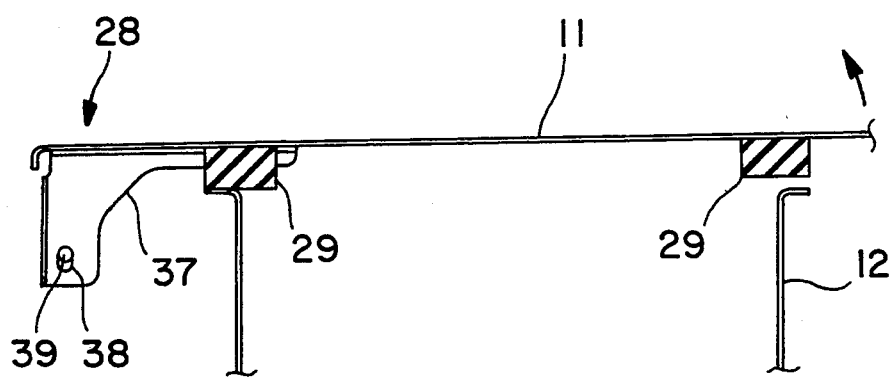
Figure 9C:
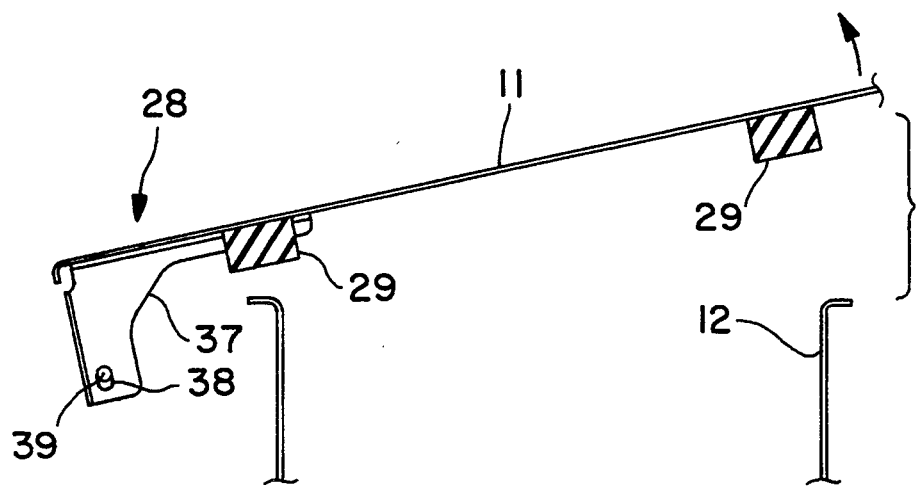

At the hinge unit 28 constructed as described above, the pin 39 and the supporting hole 38 are not mutually supported or are out of contact therebetween, as shown in FIG. 9, with the upper box body 11 placed on the lower box body 12 with intervention of the elastic members 29 (refer to FIG. 9 (A)). Consequently, such inconvenience as spoiling effective vibration suppressing action of the elastic members 29 by the corresponding hinge unit 28 can be avoided. On the other hand, in the case that the upper box body 11 is raised and opened up, centering around the hinge unit 28, the pin 39 and the supporting hole 38 are engaged with each other in accompanying with the opening up movement thereof (Refer to FIG. 9 (B) and FIG. 9 (C)). As a result, the upper box body 11 can be supported under stable condition by the hinge unit 28 when opening up and closing the upper box body 11.

Furthermore, in the preferred embodiment, an example in which a bracket 37 is installed at the upper box body and a pin 39 is installed at the lower box body 12 is described. And a hinge unit of such construction as the bracket 37 and the pin 39 are inversely attached against the above example may be employed.

Figure 10:
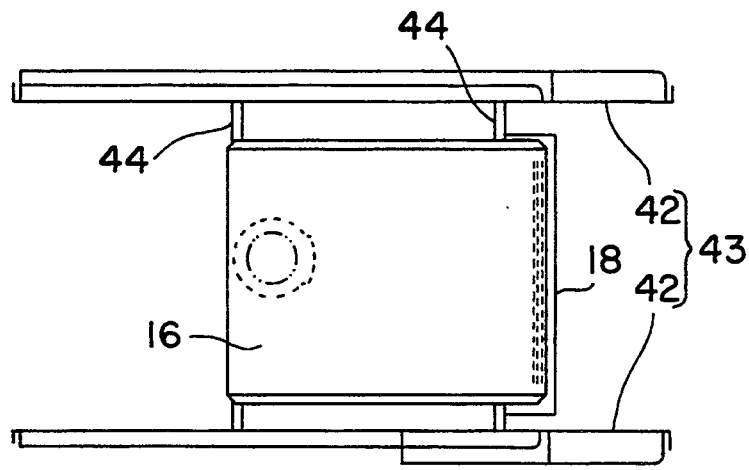
FIG. 10 is a plan view of the part shown with an arrow C in FIG. 4.
Figure 11:
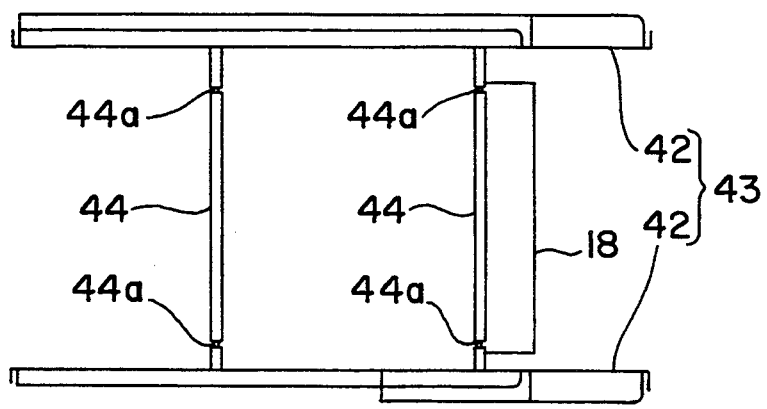
FIG. 11 is a plan view with the laser scanning unit removed, in FIG. 10.
Figure 12:
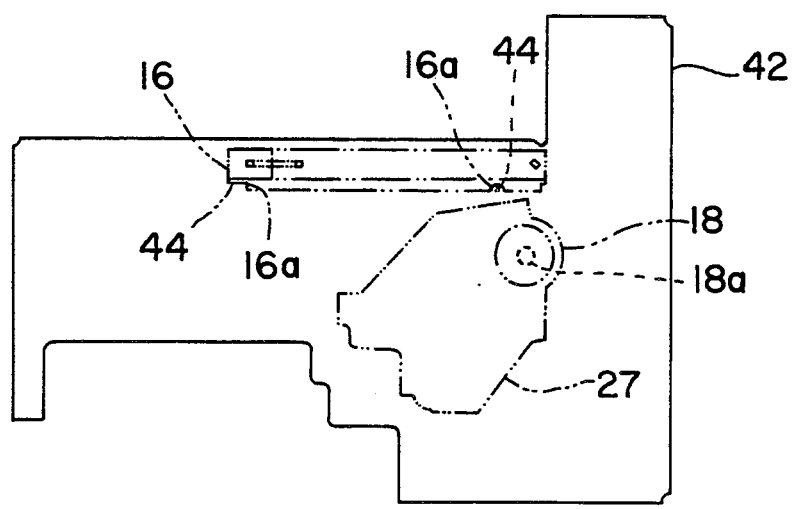
FIG. 12 is a front elevation view of a frame body shown in FIG. 10.
Figure 13:
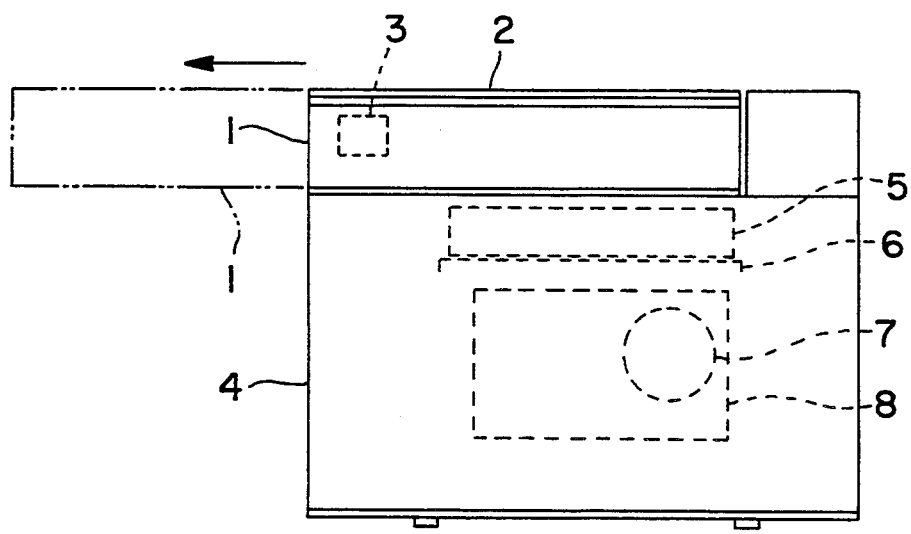
FIG. 13 is for the purpose of explaining the arts in the background of the present invention and is a front elevation view showing the outline of structure of the conventional digital image forming apparatus.

A frame body 43 comprising two side plates 42, 42 arranged in parallelism along with both the side parts of the lower box body 12 is arranged at the interior of the lower box body 12 on which the upper box body 11 supported as shown above (See FIG. 10, FIG. 11 and FIG. 12). Two bar-like members 44, 44 suitably spaced from each other in the horizontal direction are attached in parallelism with each other at the upper position of the printer unit 27 inside the frame body 43. In this case, the axial center of the bar-like members 44, 44 are set in parallelism with the axial center of the drive axis 18a of the photosensitive drum 18 which constitutes the printer unit 27. Therefore, each of the mounting portions of the bar-like members 44, 44 and the drive axis 18a relative to the side plates 42, 42 can be machined at the same time. As a result, the positional relation of the bar-like members 44, 44 and the drive axis 18a can be finished in high precision.

At an appropriate position of the bar-like member 44, a fitting groove 44a for positioning the LSU 16 is drilled and provided. As a fitting part 16a (See FIG. 12) prepared at the underside of the LSU 16 is fitted and inserted in the fitting groove 44a, the LSU 16 can be disengageably positioned and placed on the bar-like members 44, 44.

Therefore, in the structure of the above preferred embodiment, the LSU 16 can be remarkably positioned relative to the photosensitive drum 18 simply and at a high precision. Consequently, highly precision document images can be obtained.

Moreover, in the case that for example, maintenance, etc. is carried out for the printer unit 27 and for the delivery unit 23, etc. , the printer unit 27, the delivery unit 23, etc. are easily visible from the outside thereof only by removing the LSU 16 after an operator releases the engaging status of the engaging member (not shown) with the upper box body 11 opened up, thereby causing the maintenance, etc. to be remarkably easily carried out as an operator can insert his or her hands through between the bar-like members 44, 44.

Therefore, in the corresponding preferred embodiment, adverse influences due to vibrations in reading and formation of images can be prevented, and at the same time, the digital image forming apparatus can be transported and moved under a stabilized condition.

Furthermore, in a box body construction of the digital image forming apparatus according to the preferred embodiment, the vibration suppressing action of the elastic members is not affected under such a condition that the vibration suppressing action can be obtained with the upper box body placed with intervention of the elastic members on the lower box body. Moreover, when opening up and closing the upper box body, the upper box body can be opened up and closed as being securely supported.

Furthermore, it is needless to say that the box body construction pertaining to the present invention is applicable, in addition to the above digital image forming apparatus, to any other box body construction in which a vibration source like a motor, etc., is provided at least in either one with the upper box body and the lower box body separated and the upper box body is openably installed with the hinge units relative to the lower box body.

The present invention can be effected in force or embodied in another embodiments, without departing from the spirits thereof or the substantial features thereof. Therefore, the above preferred embodiments thereof are desirable, but the present invention is not limited only to the above embodiments.

Furthermore, it is understood that the scope of the invention claimed hereinafter and all variations or modifications which come within the scope meant by the claims are included in the claims thereof.

What is claimed is:

1. A box body construction of a digital image forming apparatus divided into an upper box body and a lower body and having a vibration source installed at least in either one of the upper box body or the lower box body, said box body construction further comprising an elastic member provided between the upper box body and the lower box body, said elastic member supporting the upper box body on the lower box body and the elastic member is fixed to either one of the upper box body or the lower box body and is disengagingly fixed to an other one of either the lower box body or the upper box body, whereby transmission of vibration from said vibration source to the other one of either said upper or lower box bodies is prevented.

2. The box body construction of a digital image forming apparatus claimed in the claim 1, wherein a fixing member for fixing the elastic member to the upper box body or the lower box body is installed in no contact with the lower box body or the upper box body.

3. A box body construction of a digital image forming apparatus divided into an upper box body and a lower box body and having a vibration source installed at least in either one of the upper box body or the lower box body, said box body construction further comprising an elastic member provided between the upper box body and the lower box body for supporting the upper box body on the lower box body and wherein the elastic member is fixed to either one of the upper box body or the lower box body and is disengagingly fixed to either one of the upper box body or the lower box body, whereby transmission of vibration from said vibration source to the other one of either said upper or lower box bodies is prevented.

4. The box body construction of a digital image forming apparatus claimed in the claim 3, wherein a fixing member for fixing the elastic member to the upper box body or the lower box body is installed in no contact with the lower box body or the upper box body.

5. A box body construction of a digital image forming apparatus divided into an upper box body and a lower box body and having a vibration source at least in either one of the upper box body or the lower box body, and further comprising a hinge unit for openably installing the upper box body on the lower box body, said hinge unit comprising a pin and a supporting hole, an elastic member provided between the upper box body and the lower box body for supporting the upper box body on the lower box body, and being characterized in that a size of the supporting hole in a width direction is set such that clearance is provided between the pin and the hole so that vibration cannot be mutually transmitted through the hinge unit between the upper box body and the lower box body when the upper box body is placed on the lower box body, in a vertical direction is set such that a size of the hole in the vertical direction is larger than an amount of movement of the upper box body on the elastic member when the upper box body is placed on the lower box body, such that the vibrations cannot be transmitted, and such that a load of the upper box body can be directly supported by the hinge unit with the pin engaged with the supporting hole when the upper box body is opened up, whereby transmission of vibration from said vibration source to the other one of either said upper or lower box body is prevented.

6. The box body construction of a digital image forming apparatus claimed in the claim 5, wherein the elastic member is made of rubber material of which Rockwell hardness is not less than 40 degrees and is not greater than 90 degrees.

* * * * *